(12) United States Patent
Steffens et al.

(10) Patent No.: US 10,351,177 B2
(45) Date of Patent: Jul. 16, 2019

(54) MOTOR VEHICLE BODY B-PILLAR

(71) Applicant: Muhr und Bender KG, Attendorn (DE)

(72) Inventors: Hubertus Steffens, Drolshagen (DE); Bernhard Spielvogel, Moosbach (AT)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 15/684,966

(22) Filed: Aug. 24, 2017

(65) Prior Publication Data

US 2018/0065681 A1 Mar. 8, 2018

(30) Foreign Application Priority Data

Sep. 7, 2016 (DE) .......... 10 2016 116 787

(51) Int. Cl.
*B62D 29/00* (2006.01)
*B62D 25/04* (2006.01)
*B62D 21/15* (2006.01)

(52) U.S. Cl.
CPC .......... *B62D 25/04* (2013.01); *B62D 21/157* (2013.01); *B62D 29/005* (2013.01)

(58) Field of Classification Search
CPC ...... B62D 25/04; B62D 25/06; B62D 25/025; B62D 27/023; B62D 25/082; B62D 21/157; B62D 25/02
USPC ....... 296/193.06, 203.03, 210, 191, 29, 204, 296/70; 29/897.2, 401.1, 469.5, 592.1; 228/114, 152, 155
See application file for complete search history.

(56) References Cited

U.S. PATENT DOCUMENTS

| | | | | |
|---|---|---|---|---|
| 6,296,301 B1 * | 10/2001 | Schroeder | ............ | B62D 29/046 296/187.02 |
| 2009/0309387 A1 * | 12/2009 | Goral | ............... | B29C 45/14778 296/187.03 |
| 2010/0187865 A1 * | 7/2010 | Malek | ................... | B62D 25/02 296/203.03 |
| 2013/0313862 A1 * | 11/2013 | Yamaji | ................ | B62D 25/025 296/203.01 |

(Continued)

FOREIGN PATENT DOCUMENTS

DE 10 2006 027 546 A1 12/2007
DE 102007053353 A1 5/2009

(Continued)

*Primary Examiner* — D Glenn Dayoan
*Assistant Examiner* — Sunsurraye Westbrook
(74) *Attorney, Agent, or Firm* — Bejin Bieneman PLC

(57) ABSTRACT

A B-pillar for a motor vehicle body comprises a sheet metal formed part having a head portion, a central portion and a base portion, and an inner side and an outer side. The head portion, on the inner side, comprises a connecting region for connection to a roof region of the motor vehicle body. The base portion can connect to a sill region. The central portion extends between the head portion and the base portion and defines a longitudinal direction of the B-pillar. The sheet metal formed part comprises a hat profile such that on the inner side a hollow chamber is formed; and a fiber composite part having an upper portion, a central portion and a lower portion, wherein the upper portion comprises a contact region that laterally embraces a supporting region and is supported against same in the longitudinal direction.

14 Claims, 5 Drawing Sheets

(56) References Cited

U.S. PATENT DOCUMENTS

2016/0186280 A1\* 6/2016 Breidenbach ........ C21D 9/0068
148/525

FOREIGN PATENT DOCUMENTS

| DE | 10 2012 023 653 A1 | 5/2014 |
|----|---------------------|--------|
| DE | 102014003378 A1 | 9/2015 |
| DE | 102015218152 A1 | 3/2016 |
| FR | 3030356 A1 | 6/2016 |

\* cited by examiner

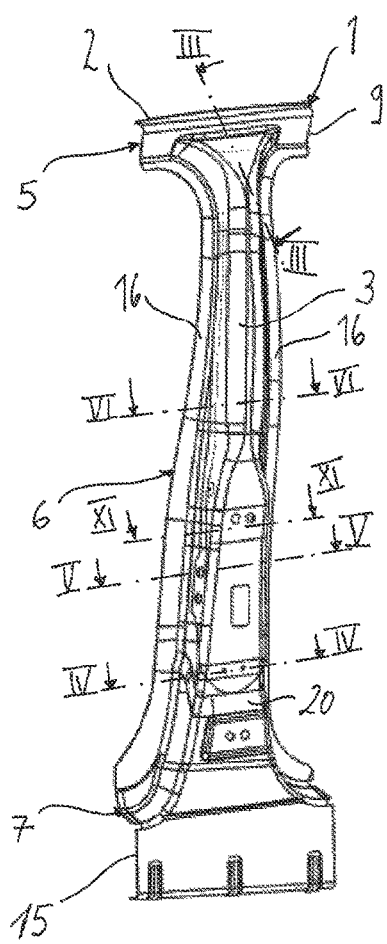
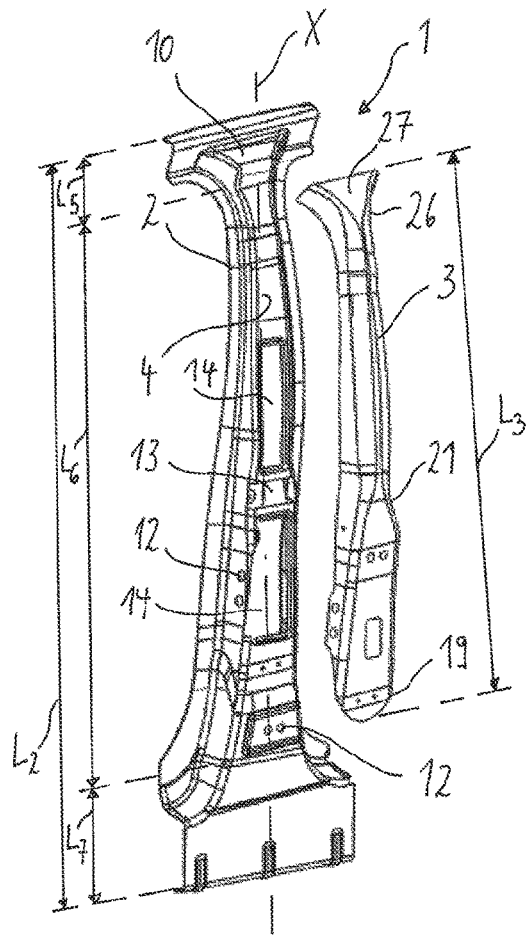
Fig. 1  Fig. 2
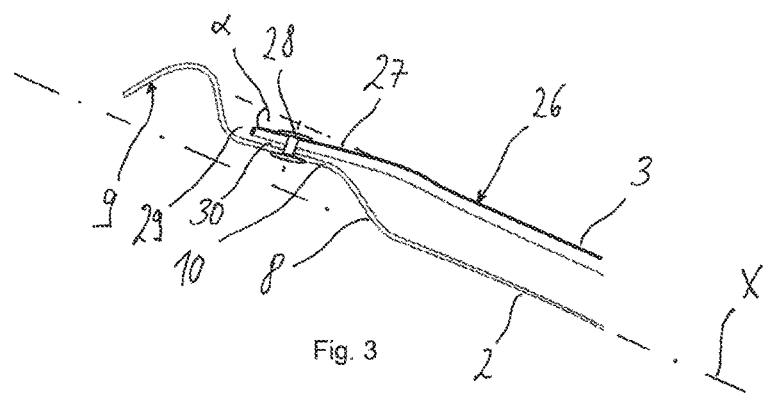
Fig. 3

MOTOR VEHICLE BODY B-PILLAR

CROSS-REFERENCE TO RELATED APPLICATIONS

This application claims priority to German Application No. DE 10 2016 116 787.8, filed on Sep. 7, 2016, which application is hereby incorporated herein by reference in its entirety.

BACKGROUND AND SUMMARY

The present disclosure relates to a B-pillar for a motor vehicle body, comprising a sheet metal formed part having a head portion, a central portion and a base portion, and having an inner side and an outer side, wherein the head portion, on the inner side, comprises a connecting region for connecting the B-pillar to a roof region of the motor vehicle body, wherein the base portion is configured for connecting the B-pillar to a sill region of the motor vehicle body, wherein the central region extends between the head portion and the base portion and defines a longitudinal direction of the B-pillar, wherein the sheet metal formed part comprises at least in the central portion a hat profile such that on the inner side a hollow chamber for receiving vehicle attaching parts is formed; and a fibre composite part having an upper portion, a central portion and a lower portion, wherein the lower portion ends in the central portion of the sheet metal formed part. Furthermore, the present disclosure also relates to a motor vehicle body having such a B-pillar.

It is known to produce B-pillars using hybrid construction in which metallic formed parts of the B-pillar are in areas reinforced by a fibre-reinforced composite material for the purpose of providing more light-weight B-pillars having an improved crash behaviour. DE 10 2006 027 546 A1 shows a multi-leaf B-pillar consisting of sheet metal formed parts that are reinforced, in the central region of the B-pillar, with a crash protection reinforcement part for the purpose of protecting the passengers in the case of a side impact. The reinforcement part consists of a fibre-plastic composite. DE 10 2012 023 653 A1 proposes a B-pillar having an inner closing part made out of a flat sheet blank, wherein a lightweight part made out of fibre-reinforced plastic is placed on the outside of the inner closing part. The fibre composite part extends along the entire length of the inner closing part.

Disclosed herein is a weight-reduced B-pillar that comprises a high degree of stiffness and meets the requirements of demanding crash scenarios. Further provided is a weight-reduced motor vehicle body that comprises a high degree of stiffness and meets the requirements of demanding crash scenarios.

In a B-pillar of the above-mentioned type the fibre composite part is attached to the outer side of the sheet metal formed part, wherein the head portion of the sheet metal formed part comprises a supporting region at the outer side, and wherein the upper portion of the composite fibre part comprises a contact region that laterally embraces the supporting region and is supported against same in the longitudinal direction of the B-pillar.

The B-pillar is a load-bearing vehicle pillar which, in the built-in condition, connects a roof region of the motor vehicle body to a sill region of the motor vehicle body. If reference is made to the "built-in condition", this means the condition in which the B-pillar is built in, i.e., installed in, the motor vehicle body between the roof region and the sill region. Terms like "lower", "upper" or "central" refer to spatial information with respect to the B-pillar in the built-in condition at the motor vehicle body.

As disclosed herein the fibre composite part is integrated into the B-pillar as a supporting and load-bearing structural element of the vehicle body. For this purpose, the fibre composite part is supported on the head portion of the sheet metal formed part, wherein, in the built-in condition, the upper portion of the fibre composite part axially, i.e., in the longitudinal direction of the B-column, overlaps with the roof region of the vehicle body, more particularly with a roof rail extending in the direction of driving. This results in a flux of force from the roof region via the composite fibre part into the sill region. In the built-in condition, the supporting fibre composite part is loaded by push loading and pull loading, and supports the roof region against the sill region. As a result of the greater strength of the fibre composite part relative to the sheet metal formed part, the fibre composite part accommodates a greater part of the load bearing function of the B-pillar than the sheet metal formed part, because, depending on the design of the fibre matrix structure, the ratio between the strength of the fibre composite part and the sheet metal formed part is about 5:1.

In the lower portion, the fibre composite part ends above the base portion. Compared to the sheet metal formed part, the fibre composite part comprises a lower elongation at break, which is the reason why the fibre composite part, upon introduction of load, gives way elastically up to a certain degree, but breaks when this degree is exceeded. Therefore, in order to provide a deformable zone at transition from the B-pillar to the sill region and/or in the door entrance area, the base portion of the B-pillar is formed by the sheet metal formed part only, thus allowing, in the case of a crash, plastical deformation. Hence, in the built-in condition, the forces acting on the fibre composite part in the lower region of the B-column are introduced entirely via the base portion of the sheet metal formed part into the sill region, so that, in the lower region of the B-pillar, a flux of force from the fibre composite part via the base portion of the sheet metal formed part into the sill region is achieved.

Furthermore, the fibre composite part is placed from outside onto the outer surface of the sheet metal formed part. In this way, the fibre composite part is arranged on the pressure-side of the sheet metal formed part, so that, in the case of a side impact, the fibre composite part is pushed against the sheet metal formed part. By integrating the fibre composite part as a supporting or load-bearing structural element on the pressure-side of the B-pillar, the fibre composite part can unbend or straighten up in the case of a side impact. If, in the case of a crash, the acting crash energy remains below the breaking force of the fibre composite part, after relief of energy, the fibre composite part returns back into its original built-in situation. In this way, the fibre composite part can flex elastically, virtually breathe, and can release the absorbed energy. As a result the present B-pillar provides a weight reduced and highly stressable vehicle pillar that has exactly two supporting or load-bearing structural elements, i.e., the sheet metal formed part and the fibre composite part.

In the built-in situation both the sheet metal formed part and the fibre composite part are integrated load-bearing structural elements of the motor vehicle body into the overall system of the vehicle.

According to one aspect of the present invention, the supporting region of the sheet metal formed part is configured to be wedge-shaped. Accordingly, the contact region of the fibre composite part can be widened upwards or from the bottom to the top, further can be configured to be fan-like.

Thus, an especially stable axial support of the fibre composite part on the head portion of the sheet metal formed part is achieved. In the region of contact, the fibre composite part can be pushed and/or laid onto the supporting region of the sheet metal formed part.

Furthermore, in the region of contact, the fibre composite part can be connected to the supporting region of the sheet metal formed part by connecting means. Thus, the connection between the fibre composite part and the sheet metal formed part is additionally strengthened in the region of contact. The connecting means can be rivets for example. In addition, the fibre composite part can be connected to the sheet metal formed part in the region of contact in a material-locking way and/or adhesive bond, e.g., particularly glued.

Furthermore, at least in its central portion, the fibre composite part can comprise a cupped or shell-like profile whose cross-section, at least in some portions, is U-shaped. Furthermore, the fibre composite part can surround the sheet metal formed part from the sides wherein the sheet metal formed part can have a hat-shaped profile at least in its central portion. Thus, the stability of the B-pillar is increased. At least in its central portion, the composite fibre part can form-lockingly or positive-lockingly rest against the sheet metal formed part.

The fibre composite part can be connected to the central portion of the sheet metal formed part by fixing means, e.g., bolted connections which are designed to attach motor vehicle components being held at the B-pillar. Thus, the fixing means can have a double function, not only to connect the fibre composite part to the sheet metal formed part, but also to fix the motor vehicle components, e.g. a closing wedge for the front door, a door lock, a door hinge, a rear door holding element, receiving means for a belt roller or belt tightening means, to the B-pillar.

Furthermore, the fibre composite part can comprise metallic connecting elements which are partly embedded into the fibre composite and protrude from the fibre composite part with free end regions. At its free end regions, the fibre composite part can be material-lockingly connected to the sheet metal formed part, e.g., by welding, for instance by spot welding or laser welding. The free end regions can protrude from the fibre composite of the fibre composite part in the longitudinal and/or transverse direction. Furthermore, the free end regions of the connecting elements can be formed of a plurality of narrow, bar-like feet or of one or several flanges extending in the longitudinal direction.

Furthermore, the fibre composite part can comprise at least one reinforcing insert embedded into the fibre composite. Thus, the crash behaviour of the fibre composite part can be modified. The reinforcing insert can be a metallic sheet metal part. For instance, it can be embedded into the structure of the surrounding fibre material layers of the fibre composite part in a form-locking and load-bearing way by braiding fibre strands. Because of its surface structure, i.e. its roughness and/or its surface coating, the reinforcing insert can be load-bearingly embedded into a matrix surrounding the fibres of the fibre composite material. A resin matrix is particularly suitable for a matrix system. The embedded reinforcing insert can be produced from a cold- or hot-formed high-strength or super high strength steel. Furthermore, the reinforcing insert can comprise a variable thickness or wall thickness in the longitudinal direction and/or in the transverse direction extending transversely, more particularly, perpendicularly to the longitudinal direction of the B-pillar. The reinforcing insert is able to absorb the compressive stresses resulting from a crash energy within the fibre composite part in an optimum way, and thus is able to improve the properties of the fibre composite part in respect of tensile strength.

Furthermore, the fibre composite part, at least in its lower portion, can rest on the sheet metal formed part in such a way that the fibre composite part is supported against the sheet metal formed part in longitudinal direction. In this way, the load bearing behaviour of the fibre composite part as a supporting structural element of the B-pillar is improved.

Furthermore, in the upper region of the base portion and/or in the lower end region of the central portion, the sheet metal formed part can comprise a hardened high-strength area. Since the fibre composite part is integrated into the B-pillar as a supporting structural element, the composite fibre part can straighten when it is pushed towards the formed sheet metal part during a side crash. Thereby, the lower longitudinal end of the fibre composite part can be pushed into the sheet metal formed part. This can result in the collapse of the sheet metal formed part. Due to the high-strength area, the sheet metal formed part said collapse can be prevented. However, the hardened high-strength area of the sheet metal formed part does not extend beyond the door entrance region of the base portion which, on the contrary, can be provided in the form of a soft deformation zone to be able to deform plastically in a crash scenario.

The sheet metal formed part can be produced from a steel plate. The steel material can be, for instance, boron steel, in particular 22MnB5, wherein other hardenable steel materials are also possible. The sheet metal formed part can also be a lightweight component made of magnesium or aluminium. In its different regions, the sheet metal formed part can comprise differently rolled sheet thicknesses, different steel and/or aluminium alloys, different surface coating conditions and different tempered conditions. In order to connect the sheet metal formed part with the vehicle body and/or adjacent components within the vehicle body, for instance beading and/or spot welding and/or laser welding can be used.

Unexpectedly, it has been found that by combining a hot-formed and at partially hardened sheet metal formed part with the fibre component part, the B-pillar comprises a sufficiently high degree of stiffness for meeting the requirements of demanding crash scenarios. Even more, the B-pillar comprises a spring-like and in the elastic state deformable basic shape. Hence, cold-formed parts, which are commonly considered as being capable of bearing high loads, are not necessary. However, in principle, the sheet metal formed part could also be a cold-formed part. As a benefit of the integration of the fibre composite part as a supporting structure element, the hot-formed and at least partially hardened sheet metal formed part can be thin-walled.

The sheet metal formed part can be produced from a tailor rolled blank or a tailor welded blank, and thus, along its length, comprises a variable sheet thickness. Thus, the sheet metal formed part can be specifically and locally adjusted. Any zones which are subjected to less stress can comprise a lower sheet thickness compared to higher stressed zones of sheet metal formed parts. For example, the sheet thicknesses of the sheet metal formed part can vary between 0.7 and 3 mm (millimeters). More particularly, the sheet metal formed part can have a sheet thickness in its head portion of 1 mm to 3 mm, and in its central portion of 0.7 mm to 2 mm, and in the base portion of 1 mm to 3 mm. Furthermore, in addition to commonly provided recesses, which serve to mount motor vehicle components, the sheet metal formed part more particularly in its central portion can comprise further recesses for specifically reducing the weight of the sheet metal formed part. The resulting weakening of the sheet metal formed part is deliberately accepted, because it is not the sheet metal formed part, but the fibre composite part which bears the main load of the B-pillar. This means that more than half the load acting on the B-pillar in the longitudinal direction is supported by the fibre composite part.

Hot-forming refers to the process of forming metals above the recrystallisation temperature. Hot-forming and hardening can take place in one process in a press hardening tool. This combined process of forming and hardening is also referred to as press hardening. For instance, the sheet metal formed part is produced from a blank which, prior to being hot-formed, is heated up to at least 800 to 850 degrees Celsius, then is inserted into a forming tool and is formed in a hot condition, and by contacting the forming tool, it is quickly cooled. The forming tool can be force-cooled from the inside. The process of cooling the sheet metal formed part in the forming tool can take place within approximately 15 seconds or less to approximately 200 degrees, for example. Besides to the above-described press hardening process, the sheet metal formed part can also be hardened in a different way. According to a possible embodiment, the hardened sheet metal formed part can also comprise local soft zones which, in the case of a crash, can serve in particular as defined deformation zones. The mechanical properties of the soft zones can be configured to meet certain requirements. For example, soft zones being configured as failure areas can comprise an elongation of break value that is clearly higher than an elongation of break value of the hardened base material. Preferably, the elongation at break in the soft zones amounts to more than 10%, more particularly 10 to 15%. Contrary, the elongation of break of the hardened base material of the lower formed part can amount to approximately 4% to 7%.

Furthermore, the sheet metal formed part can be coated, e.g., by an aluminium-silicon-alloy or zinc coating to serve as corrosion protection and also to avoid scaling during the hot-forming process. The sheet metal formed part can be coated before and/or after the hot-forming process. When coating takes place before the hot-forming process, it is possible, on the one hand, to coat a strip material out of which the sheet metal formed part can be produced or, on the other hand, to coat the blank itself. When coating takes place after the hot-forming process, the sheet metal formed part being formed and in particular already hardened, can be coated.

The fibre composite part can contain carbon fibres and/or glass fibres and/or even aramide fibres and/or metallic fibres. The fibres of the fibre composite material can be embedded in a resin matrix, more particularly in an epoxy matrix. More particularly, the fibre content can also comprise a combination of the above-mentioned fibres. Furthermore, by axial or multi-axial alignment of the fibres it is possible to modify the fibre composite with regard to the respective application areas and required crash properties. In addition to the selections of fibres or the fibre alignment, the fibre composite part can also be adapted by locally different wall thicknesses. This can be achieved by varying the number of fibre layers. In this way, the crash behaviour of the B-column can be adjusted or varied section by section.

The fibre composite part can be connected to the sheet metal formed part by gluing and/or nailing and/or bolted connections. Between the sheet metal formed part and the fibre composite part it is possible to provide a blocking or uncoupling layer, for instance made out of a glue in order to prevent contact corrosion between the fibre composite part and the sheet metal formed part. In order to achieve a stable connection between the two supporting structural elements, the fibre composite can be connected to the sheet metal formed part in a planar way.

In one example, an outer edge of the fibre composite part can be spaced from an outer edge of the sheet meal formed part in such a way that between the outer edge of the fibre composite part and the outer edge of the sheet metal formed part, the sheet metal formed part forms a single-layered connecting flange of the B-pillar for connecting a door seal and/or an outer vehicle skin and/or a glass panel with the sheet metal formed part. In this way, the sheet metal formed part is the only partner to be connected with further components which do not form part of the B-pillar. Thus, the outer vehicle skin can be welded to the single-layered connecting flange. The fibre composite part does not extend beyond the connecting flange. In a preferred embodiment, the sheet metal formed part forms two spaced, radially outer connecting flanges that, in the longitudinal direction, preferably extend at least along the entire length of the central portion.

To ensure that the connecting flange can be as wide as possible, the sheet metal formed part can comprise two opposed side walls, with the fibre composite part resting on outer shoulders of the side walls. The side walls adjoin radially inwards the respective connecting flange.

The sheet metal formed part extends along the entire length of the B-column. Typically, a B-column of a conventional passenger car has a length of about 1.30 to 1.50 m (meters). The length of the head portion merely serving to connect the sheet metal formed part to the roof region of the motor vehicle body and supporting the fibre composite part is smaller than or equal to 15% of the length of the sheet metal formed part. The head portion can be flange-like. More particularly, the head portion can be U-shaped in the longitudinal section and, in the built-in condition, embrace the roof rail from the outside. At the transition to the central portion, the lower head portion can comprise a tapered section and/or the upper central portion can comprise a widened section. The length of the base portion comprising a deformation zone of the B-pillar and serving for connection to the sill region, can be smaller than or equal to 25% of the length of the sheet meal formed part. The base portion can be flange-like and, in the built-in condition, embrace the sill region from the outside. More particularly, the base portion can comprise a U-shaped cross-section and, at the transition to the central portion, can comprise a tapered portion. Alternatively, the base portion can comprise a connecting bar that can engage with a recess in the sill region coming from above for the purpose of connecting the B-pillar in the built-in condition via a plug-in connection with the sill region. Between the head portion and the base portion there extends the central portion which commonly, for passenger protection purposes, is high-strength. The length of the central portion is approximately 60% to 90% of the length of the sheet metal formed part.

The fibre composite part starts within the height of the head portion and ends in the central portion of the sheet metal formed part. Accordingly, the length of the fibre composite part is between 50% to 90% of the length of the sheet metal formed part. Using the above-mentioned length of the sheet metal formed part between 1.30 and 1.5 m as an example, the fibre composite part can thus comprise a length of approximately 0.65 to 1.35 m. The length of the head portion of the sheet metal formed part can be smaller than or equal to 0.23 m and the length of the base portion of the sheet metal formed part can be smaller than or equal to 0.37 m.

In order to provide an especially lightweight B-pillar with a small number of parts, the fibre composite part can be the outermost part of the B-pillar. I.e. on the B-pillar outside facing away from a vehicle interior, the fibre composite part is not covered by a supporting structural element of the B-pillar. Independently of the above, smaller sheet metal parts for mounting or connecting the vehicle parts such as a closing wedge for the front door, a door lock, a door hinge or a rear door holding element can be arranged on the outside of the fibre composite part, which faces away from the vehicle interior. In the built-in condition, the fibre composite part, in turn, can be covered by the outer vehicle skin that is usually fixed to the vehicle body only after completion of same. In order to provide an especially lightweight vehicle body, the fibre composite part can be visible from the outside in the built-in condition, so that the fibre composite part in the built-in condition of the B-pillar is not, or at least not fully, covered by the outer vehicle skin.

Furthermore, the sheet metal formed part can be the innermost formed part of the B-pillar. I.e. on the inside of the B-pillar facing the vehicle interior, the sheet metal formed part is not covered by any structural element of the B-pillar. By combining the sheet metal formed part with the fibre composite part, there is no need for a closing plate known from the state of the art, also referred to as cover or inner plate.

A further solution to the above-mentioned problem is achieved by providing a motor vehicle body having the above-mentioned B-pillar. Because of the presently disclosed motor vehicle body, there are achieved the same advantages as obtained in connection with the disclosed B-pillar, so that, briefly, reference can be made to the above descriptions. It is understood that all the above-mentioned embodiments of the B-pillar can be used for the motor vehicle body, and vice versa. Overall, the presently disclosed motor vehicle body is characterised by a reduced number of parts and a reduced weight, further, it comprises a high degree of stiffness and is able to meet the requirements of demanding crash scenarios.

In particular, the fibre composite part of the B-pillar in the motor vehicle body is visible from the outside. In other words, the fibre composite part of the B-pillar is not, or not fully, covered by the outer vehicle skin and, more particularly, is visible if the front door is open.

SUMMARY OF THE DRAWINGS

Examples will be explained below with references made to the drawings, wherein

FIG. 1 shows a B-pillar according to a first embodiment in a perspective view.

FIG. 2 shows the B-pillar in an exploded view.

FIG. 3 shows the B-pillar in a cross-sectional view along sectional line III-III shown in FIG. 1.

DESCRIPTION

Figure 4:
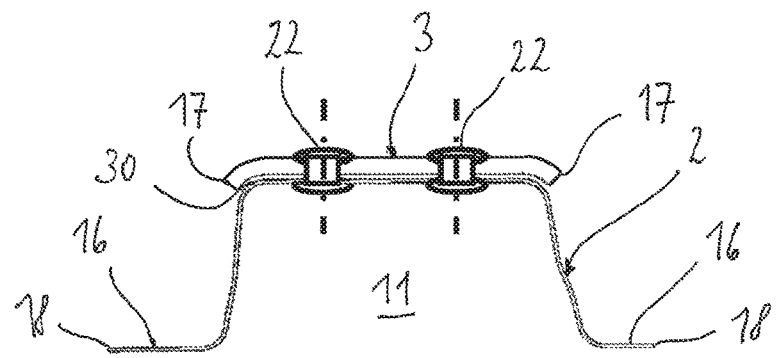
FIG. 4 shows the B-pillar in a cross-sectional view along sectional line IV-IV shown in FIG. 1.
Figure 5:
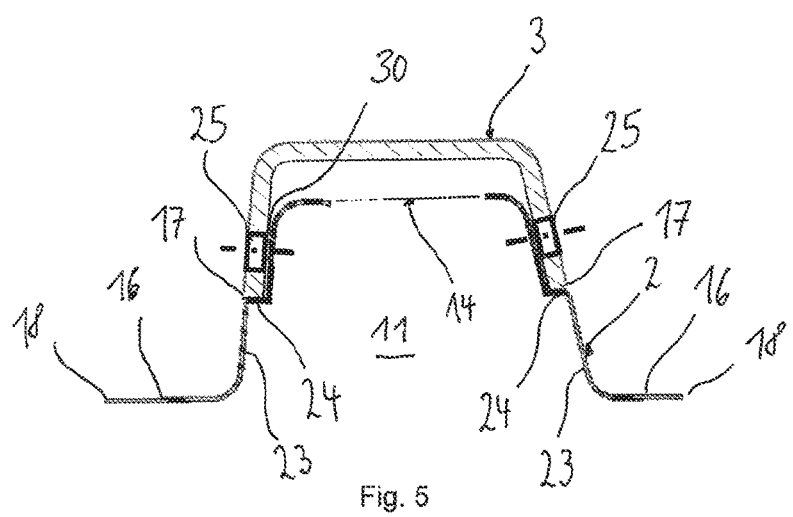
FIG. 5 shows the B-pillar in a cross-sectional view along line V-V shown in FIG. 1.

FIGS. 1 to 6 show a motor vehicle pillar of a motor vehicle body in the form of a B-pillar 1 according to a first example. The B-pillar 1 comprises an elongated hollow basic structure. In a built-in condition, in which the B-pillar 1 is integrated as a supporting structural element in the motor vehicle body, the B-pillar 1 connects a roof region with a sill region.

More particularly in FIG. 2 it can be seen that the B-pillar 1 comprises two load bearing or supporting structural elements, i.e., a sheet metal formed part 2 and a fibre composite part 3. The fibre composite part 3 is cupped or shell-like and is placed from the outside on an outer side 4 of the cupped or shell-like sheet metal formed part 2. In the built-in condition of the B-pillar 1, the outer side 4 faces away from a passenger compartment (not shown). Thus, the fibre composite part 3 is arranged on the pressure side of the B-pillar 1, so that in the event of a side impact the fibre composite part 3 is pushed against the underlying sheet metal formed part 2.

In detail, the sheet metal formed part 2 comprises, from top to bottom, a head portion 5, a central portion 6 and a base portion 7, wherein the central portion 6 defines a longitudinal direction X of the B-pillar 1. In a conventional passenger car, the sheet metal formed part 2 can comprise a length, for example, of approximately 1.30 to 1.50 m. It can be seen in FIGS. 1 and 2, that the length $L_5$ of the head portion 5, in this case, is smaller than 15% of the length $L_2$ of the sheet metal formed part 2 and corresponds to approximately 12% of the length $L_2$ of the sheet metal formed part 2. The length $L_7$ of the base portion 7, in this case, is smaller than 25% of the length $L_2$ of the sheet metal formed part 2 and corresponds to approximately 18% of the length $L_2$ of the sheet metal formed part 2. The length $L_6$ of the central portion 6 thus amounts to approximately 70% of the length $L_2$ of the sheet metal formed part 2.

The head portion 5, in the built-in condition, connects the roof region, more particularly the roof rail, to the B-pillar 1. At an inner side 8 of the sheet metal formed part 2 facing the passenger compartment, there is formed an upper connecting area 9. For example, in FIG. 3 it can be seen that the upper connecting area 9 is flange-like having an approximately u-shaped cross-section for the purpose of embracing the roof rail from the outside in the built-in condition. At the level of the upper connecting area 9, the sheet metal formed part 2 comprises a supporting area 10 at the outer side 4 of the head portion 5. Via the supporting area 10, the composite fibre part 3 can be supported against the roof region, more particularly against the roof rail. The supporting area 10 is wedge-shaped and widens upwardly from a lower tapered portion.

Directly below the head portion 5 is the central portion 6 of the sheet metal formed part 2. At least along the central portion 6, the sheet metal formed part 2 comprises a hat profile so that on the inner side 8 a cavity 11 is formed for receiving vehicle parts (not shown) such as a closing wedge for the front door, a door lock, a door hinge, a rear door holding element, a belt roller or a belt tightening element or a connecting point for said vehicle parts. Furthermore, the sheet metal formed part 2 comprises a plurality of through-holes 12 for fixing the vehicle parts. In addition, in a centre leg 13 of the hat-shaped central portion 6, there are formed large-surface recesses 14 for the purpose of specifically reducing the weight of the sheet metal formed part 2. By large-surface recesses 14 is understood that the total area of the recesses 14 extends over at least 10%, preferably between 20% and 80%, more particularly between 25% to 50% of the surface of the centre leg 13 of the sheet metal formed part 2.

At the lower end of the central portion 6 directly is the base portion 7 of the sheet metal formed part 2 which serves to connect the B-pillar 1 to the sill region. The base portion 7 comprises a lower connecting area 15 having an approximately U-shaped cross section and embracing the sill region in the built-in condition from the outside.

Two radially outward connecting flanges 16 extend over the three portions, i.e., the head portion 5, the central portion 6 and the base portion 7, and form single-layer flange portions of the B-pillar 1. In detail, outer edges 17 of the fibre composite part 3 are spaced apart from outer edges 18 of the sheet metal formed part 2 in such a way that the sheet metal formed part 2 between the outer edges 17 of the fibre composite part 3 and the outer edges 18 of the sheet metal formed part 2 form the single-layer connecting flange 16 of the B-pillar 1. I.e., the single-layer connecting flanges 16 formed by the sheet metal formed part 2 are not covered by the fibre composite part 3. Consequently, further metallic vehicle components such as an outer vehicle skin 38 can be welded to the connecting flange 16. Moreover, a door seal can be attached to the connecting flange 16 and/or a glass surface can be glued onto.

The sheet metal formed part 2 is, for example, a hot formed and at least partially hardened formed part which can be produced, for example, from a 22MnB5 steel plate and can be provided with an aluminium silicon coating. In the longitudinal direction X, the sheet metal formed part 2 comprises different sheet thicknesses, wherein the sheet thickness can be adapted to meet customer-specific requirements with regard to crash zones.

In order to provide a high-strength central part of the B-pillar 1 that is essential for the protection of the passengers, the fibre composite part 3 covers most of the central portion 6 of the sheet metal formed part 2. It can be seen in FIGS. 1 and 2 that the length $L_3$ of the fibre composite part 3 is between 50% and 90%, in particular approximately 75% of the length $L_2$ of the sheet metal formed part 2. The fibre composite part 3 extends over the central portion 6 and the head portion 5 of the sheet metal formed part 2.

In detail, a lower portion 19 of the fibre composite part 3 ends within the central portion 6. Thus, the fibre composite part 3 and the base portion 7 of the sheet metal formed part 2 are axially spaced apart from one another. In other words, the fibre composite part 3 does not overlap the base portion 7 of the sheet metal formed part 2, so that at the transition from the B-pillar 1 to the sill region, the B-pillar 1 is defined only by the material characteristics of the sheet metal formed part 2 in the base portion 7.

Furthermore, in FIGS. 1 and 2 it can be seen that the lower portion 19 of the fibre composite part 3 comprises a straight cross-section and, in a top view, forms a semi-circle. In addition, the lower portion 19 of the fibre composite part 3 rests on the lower central portion 6 of the sheet metal formed part 2 in a form-locking manner and is supported in the longitudinal direction X. In order to prevent the lower portion 19 of the fibre composite part 3 from being pushed into the sheet metal formed part 2 in the event of a crash, the sheet metal formed part 2 comprises a hardened high-strength portion 20 in the lower central portion 6.

At the transition of the lower portion 19 and an adjoining central portion 21, the fibre composite part 3 is connected to the sheet metal formed part 2 by rivets 22, shown in FIG. 4. The central portion 21, starting from the lower portion 19 of the fibre composite part 3 and extending upwardly in longitudinal direction X, comprises a U-shaped profile so that the fibre composite part 3 laterally embraces the hat profile of the sheet metal formed part 2 and/or partially overlaps with same. It can be seen in FIG. 5 that the sheet metal formed part 2 in the central portion 3 comprises two opposed side walls 23 that, on the radial inside, adjoin the respective connecting flange 16. The side walls 23, by way of example, each comprise an outer shoulder 24 on which the fibre composite part 3 rests. In the region of the contact area, the fibre composite part 3 and the sheet metal formed part 2 are connected by fixing means 25 which are configured for attaching vehicle components to be held at the B-pillar 1.

In order to integrate the fibre composite part 3 as a supporting structural element of the B-pillar 1, the fibre composite part 3 is supported in an upper portion 26 at the head portion 5 of the sheet metal formed part 2. In detail, the fibre composite part 3, in the upper portion 6, comprises a contact region 27 widening upwardly that laterally embraces the supporting region 10 of the sheet metal formed part 2 and that is supported against the supporting region 10 in longitudinal direction X of the B-pillar 1. Furthermore, in the contact region 27, the fibre composite part 3 is connected to the supporting region 10 of the sheet metal formed part 2 by connecting means such as rivets 28. More particularly in FIG. 3 it can be seen that the upper portion 26 of the composite fibre part 3 is inclined slightly inwardly, i.e. towards the passenger compartment at an angle α of approximately 10°. The upper end of the fibre composite part 3, by forming a gap 29, is slightly spaced apart from the outer side 4 of the sheet metal formed part 2 in the region of the upper connecting area 9 being flange-like bend. In the built-in condition, the fibre composite part 3 is supported with the contact region 27 via the supporting region 10 of the sheet metal formed part 2 against the roof rail. Furthermore, the lower portion 19 rests against the sheet metal formed part 2 in a form-locking manner, so that the fibre composite part 3 is also supported via the central portion 6 of the sheet metal formed part 2 in longitudinal direction X.

In order to further optimise the stability and the crash behaviour of the B-pillar 1, the composite fibre part 3, in the central portion 21 and/or in the upper portion 26 and/or in the lower portion 19, can be connected to the sheet metal formed part 2 by a gluing, and/or riveting, and/or nailing, and/or bolting connecting technology.

The fibre composite part 3 can comprise carbon fibres, and/or glass fibres and/or even basalt fibres and/or metallic fibres. The fibres of the fibre composite material can be embedded in a resin matrix, e.g., in an epoxy matrix.

Further, the fibre content can also include a combination of the previously mentioned fibres. Furthermore, by axial or multi-axial alignment of the fibres, it is also possible to adapt the fibre composite part 3 to the requirements of the respective application area. In addition to selecting the type of fibre or the alignment of the fibres, the fibre composite part 3 can also be adapted by using locally differing wall thicknesses by varying the number of fibre layers. In this way it is possible to specifically adjust the crash behaviour of the whole B-pillar 1 or portion to portion. In order to prevent contact corrosion between the fibre composite part 3 and the sheet metal formed part 2, it is possible to provide a blocking layer between said two structural parts 2, 3 or to provide an uncoupling layer 30, for example made out of a glue.

Figure 6:
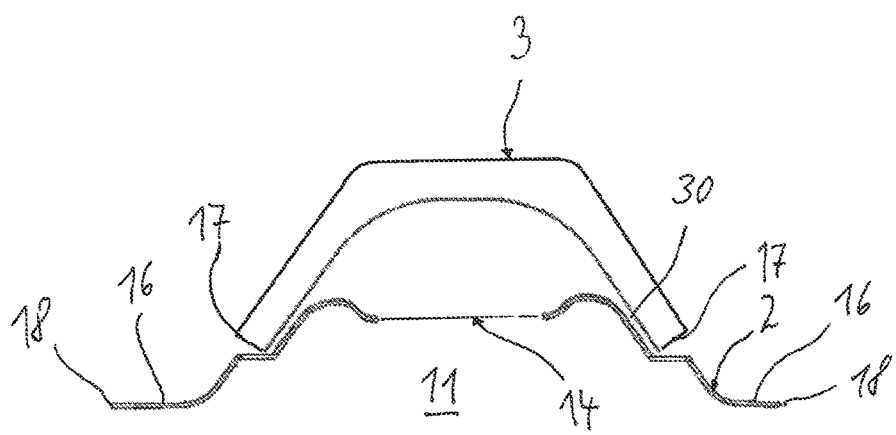
FIG. 6 shows the B-pillar in a cross-sectional view along sectional line VI-VI shown in FIG. 1.

By integrating the fibre composite part 3 in the form of a supporting structural element on the pressure side of the B-pillar 1, the fibre composite part 3, in the event of a lateral impact, can straighten or unbend. For the purpose of setting the fibre composite part 3 with regard to its bending behaviour, also referred to as "flex", especially the central portion 21 can be adapted to a defined behaviour by varying the shape, and/or the wall thickness and/or the strength. FIG. 6 shows one example, further examples being shown in FIGS. 7, 8 and 12, which are explained in greater detail below.

Figure 7:
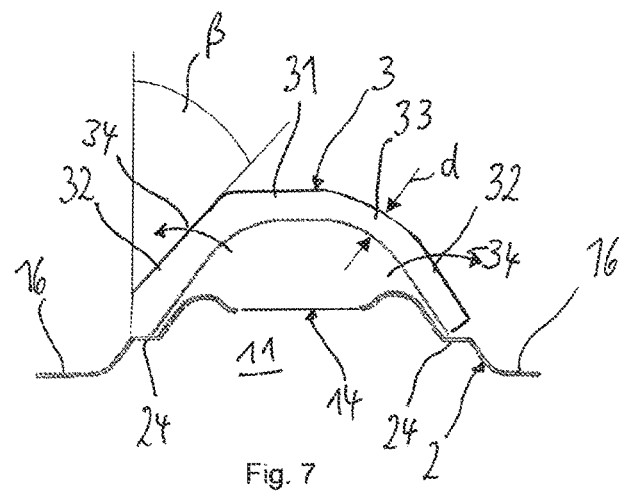
FIG. 7 shows a B-pillar in a second embodiment in a cross-sectional view along line VI-VI shown in FIG. 1.

FIG. 7 shows an alternative example of the B-pillar in a cross-sectional view along line VI-VI shown in FIG. 1. It can be seen that along the head region of B-pillar 1, the fibre composite part 3 can comprise areas of different wall thicknesses in order to modify the crash behaviour of the B-pillar 1. In detail, the fibre composite part 3, having at least in the upper portion 26 an u-profile as shown, comprises an outer wall 31 and two side walls 32 protruding from the outer wall 31. With regard to FIG. 7, at the righthand region of transition between the outer wall 31 and the right side wall 32, there is formed a joint-like weakening of the material in the form of a material taper 33 having the wall thickness d. Because of this substantial weakening of the fibre composite part 3 at the region of transition from the outer wall 31 to the side wall 32, the elastic behaviour of the B-pillar 1 can be influenced with respect to a force acting on the B-pillar 1 from the outside. In this way, it is possible to modify the crash behaviour of the B-pillar 1. In the event of a crash, the outer wall 31 of the fibre composite part 3 can be pressed towards the underlying sheet metal formed part 2, wherein the side walls 32 can give way to the outer wall 31 by straightening relative to the sheet metal formed part 2 in the direction of the arrow 34. The material weakening can be achieved, for example, by applying a smaller number of laminate layers as compared to the adjoining portions of the fibre composite part 3.

Furthermore, the elastic behaviour of the B-pillar 1 can be modified by varying the angle β of the side walls 32 relative to the sheet metal formed part 2.

In FIG. 7, on the lefthand side, there is shown the possibility of modifying the elastic behaviour of the B-pillar 1 by changing the angle β, whereas on the righthand side of FIG. 7 there is shown the modification of the elastic behaviour by using the material taper 33. These two options are only shown in one Figure in order to ease comparisons of the two options. In principle, both options can be combined or used separately, however these options can be realised at both transition areas.

Figure 8:
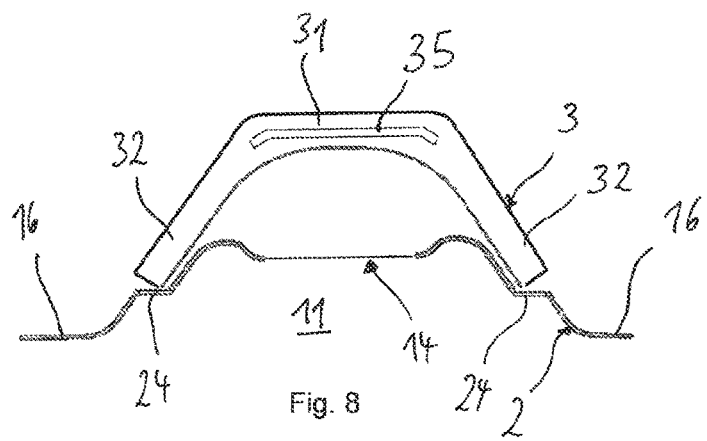
FIG. 8 shows a B-pillar according to a third embodiment in a cross-sectional view along sectional line VI-VI shown in FIG. 1.

FIG. 8 shows a further alternative example of the B-pillar 1 in a cross-sectional view along sectional line VI-VI shown in FIG. 1. It can be seen that for the purpose of modifying the crash behaviour of the B-pillar a metallic insert 35 is embedded into the matrix system of the fibre composite part 3. Depending on customer-specific requirements regarding the crash behaviour, the reinforcing insert 35 can be produced from a cold-formed or hot-formed high-strength steel or super high strength steel. Furthermore, the reinforcing insert 35, in longitudinal direction X, can comprise a variable wall thickness. In the cross-sectional view shown in FIG. 8 it can be seen that the reinforcing insert 35 can comprise an approximately U-shaped or dish-shaped profile. However, in principle the reinforcing insert 35 can be configured on the one hand to be narrower, more particularly strip-like or on the other hand significantly wider, so that the reinforcing insert 35 can extend considerably further into the side walls 32.

Figure 9:
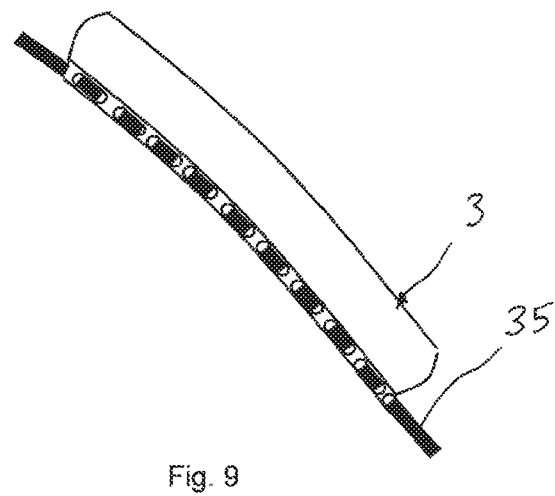
FIG. 9 shows a reinforcing inlay of the B-pillar according to FIG. 8.

In FIG. 9 it can be seen that by braiding fibre strands of the fibre composite part 3 into the reinforcing insert 35, it can be embedded in a form-locking manner and/or load-bearingly into the laying structure of the surrounding fibre materials of the composite fibre part 3. Because of its surface condition and/or roughness and/or coordinated surface coating concept, the reinforcing insert 35 can be embedded supportingly into a matrix surrounding the fibres of the fibre composite material.

Figure 10:
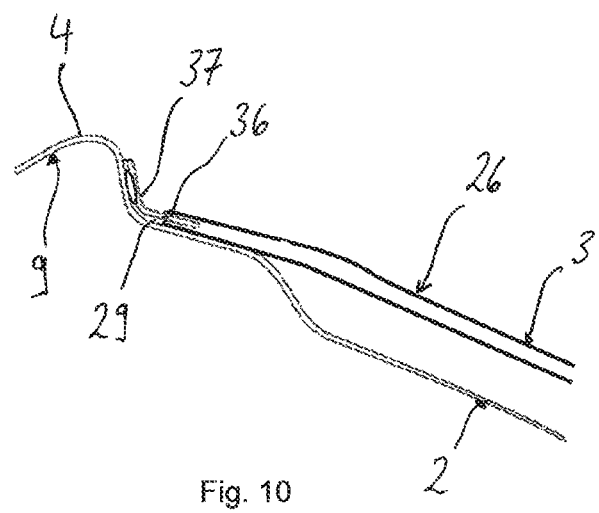
FIG. 10 shows a B-pillar according to a fourth embodiment in a cross-sectional view according to the sectional line III-III shown in FIG. 1.
Figure 11:
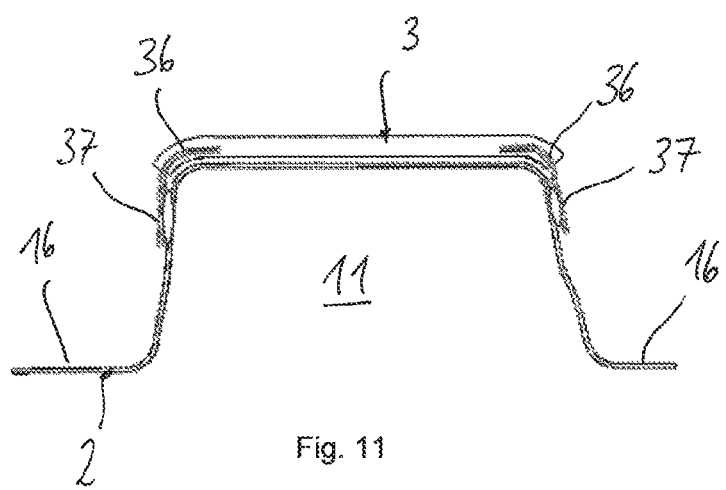
FIG. 11 shows the B-Pillar in a cross-sectional view along sectional line XI-XI shown in FIG. 1.
Figure 12:
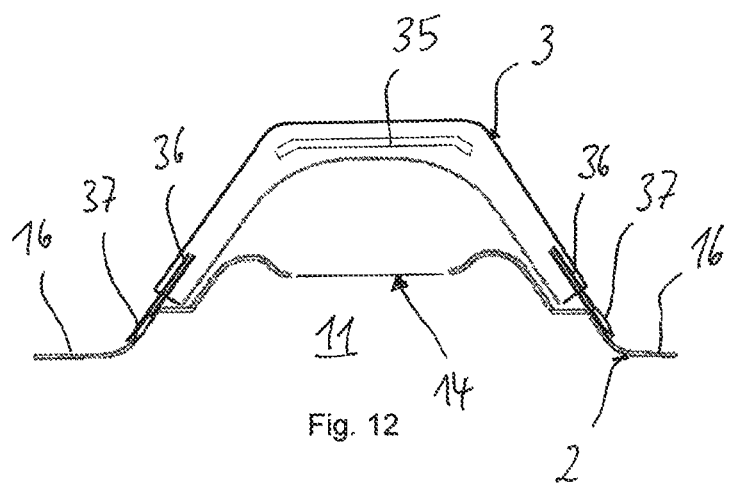
FIG. 12 shows the B-pillar according to FIG. 10 along the cross-sectional line VI-VI shown in FIG. 1.

FIGS. 10 to 12 show a B-pillar 1 according to a further example. This examples differs from the above-described examples of FIGS. 1 to 9 only in that that for connecting the fibre composite part 3 to the sheet metal formed part 2, there are provided additional metallic connecting elements 36. Thus, the explanations with regard to the embodiments according to FIGS. 1 to 9 can also be referred to with respect to the embodiments according to FIGS. 10 to 12.

FIG. 10 shows the B-pillar in a cross-sectional view of the sectional line III-III shown in FIG. 1. For additional reinforcement of the connection between the fibre composite part 3 and the sheet metal formed part 2, a metallic connecting element 36 is embedded into the fibre matrix of the fibre composite part 3. It can be seen in FIG. 10 that the connecting element 36 is partly embedded into the fibre composite of the fibre composite part 3 and projects with free end regions 37 out of the fibre composite. The fibre composite part 3 is at its free end region 37 firmly bonded to the sheet metal formed part 2, for example, by welding. The connecting element 36 can comprise a plurality of narrow, bar-like feet each having a free end region 37 or a flange extending in transverse direction. It is also possible to provide a plurality of connecting elements 36 for the purpose of connecting the fibre composite part 3 to the sheet metal formed part 2 in several points. As far as welding is concerned, spot welding or laser welding processes are suitable. To achieve an especially good supporting condition and an especially good connection between the fibre composite part 3 and the outer side 4 of the head portion 5 of the sheet metal formed part 2, the connecting element 36 can be bent, as shown in FIG. 10, to follow the outer contour of the flange-like upper connecting area 9. Furthermore, the connection between the sheet metal formed part 2 and the fibre composite part 3 in the head portion 5 can be reinforced by rivet connection, as shown in FIG. 3 with regard to the rivet 28.

FIGS. 11 and 12 show further cross-sectional views of the B-pillar 1 shown in FIG. 10. In detail, FIG. 11 shows the cross-sectional view along the sectional line XI-XI shown in FIG. 1, and FIG. 12 shows the cross-sectional view along the sectional line VI-VI as shown in FIG. 1. It can be seen that the fibre composite part 3 can be connected in these regions also by the connecting elements 36 to the sheet metal formed part 2. The sections shown in FIGS. 10 to 12 act as examples for the fact that the fibre composite part 3 can be connected to the sheet metal formed part 2 along its entire length continuously or with interruptions by the connecting elements 36, wherein the connections can be weld connections.

Figure 13:
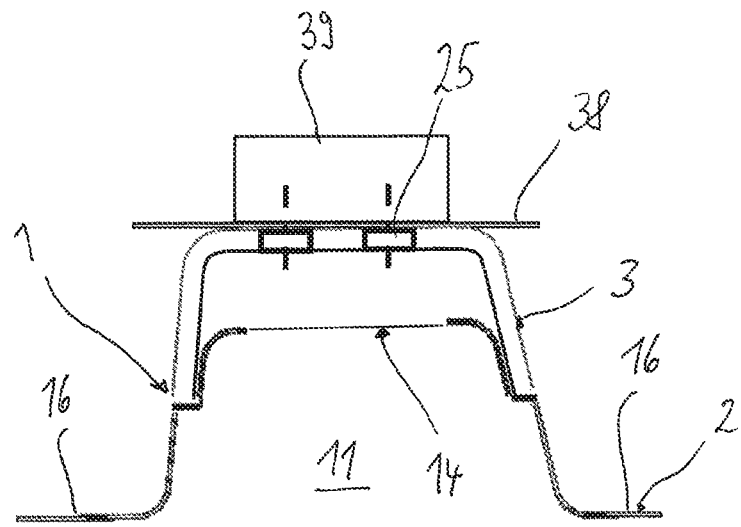
FIG. 13 shows a vehicle body according to a first embodiment in cross-sectional view having the B-pillar according to FIG. 1.

FIG. 13 shows a motor vehicle body according to a first example having a B-pillar 1 as shown in FIGS. 1 to 6 and described above. In a very simplified way it is shown that in the built-in condition, an outer vehicle skin 38 can rest on the fibre composite part 3 in a planar way. By means of fixing means 25 serving to attach the vehicle parts such as a closing wedge 39 for the front door, a door lock, a door hinge or a rear door holding element, the outer vehicle skin 38 can be fixed to the fibre composite part 3 of the B-pillar 1. Furthermore, the outer vehicle skin 38, in a way not illustrated, can be connected to the connecting flanges 16 of the sheet metal formed part 2.

Figure 14:
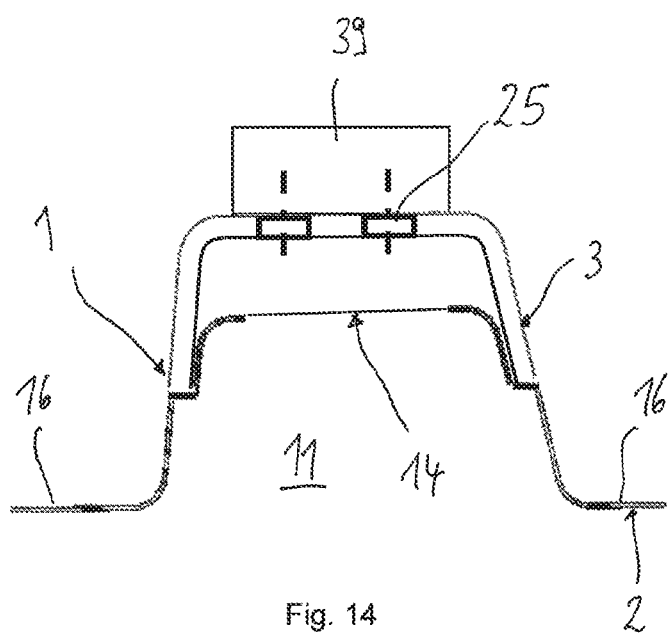
FIG. 14 shows a motor vehicle body according to a second embodiment in a cross-sectional view having the B-pillar according to FIG. 1.

FIG. 14 shows a motor vehicle body according to a second example having the above-described B-pillar 1 as illustrated in FIGS. 1 to 6. As compared to the motor vehicle body according to FIG. 13, the B-pillar 1 in the embodiment according to FIG. 14 is not covered by an outer vehicle skin 38. Thus, the fibre composite part 3 is always visible, even in the built-in condition of the B-pillar 1. A vehicle driver or passenger, when opening a vehicle door will visually perceive that the supporting structural element of the B-pillar 1 in the form of the fibre composite part 3 is produced out of fibre-reinforced plastics.

The invention claimed is:

1. A B-pillar for a motor vehicle body, comprising:
   a sheet metal formed part that includes a head portion, a central portion and a base portion, and an inner side and an outer side;
   wherein the head portion, on the inner side comprises a connecting region for connecting the B-pillar to a roof region of the motor vehicle body;
   wherein the base portion is configured for connecting the B-pillar to a sill region of the motor vehicle body;
   wherein the central portion extends between the head portion and the base portion and defines a longitudinal direction of the B-pillar, wherein the sheet metal formed part comprises at least in the central portion a hat profile such that on the inner side a hollow chamber for receiving vehicle attaching parts is formed; and
   a fibre composite part having an upper portion, a central portion and a lower portion,
   wherein the lower portion ends in the central portion of the sheet metal formed part; and
   wherein the fibre composite part is attached to the outer side of the sheet metal formed part, the outer side facing away from the hollow chamber for receiving vehicle attaching parts, and wherein the head portion of the sheet metal formed part comprises a supporting region at the outer side, wherein the upper portion of the composite fibre part comprises a contact region that laterally embraces the supporting region and is supported against same in the longitudinal direction of the B-pillar.

2. The B-pillar of claim 1, wherein the supporting region is wedge-shaped and wherein the contact region is widened upwards.

3. The B-pillar of claim 1, wherein, in the contact region, the fibre composite part is connected to the supporting region of the sheet metal formed part by fasteners, the fasteners including at least one of rivets, screws, and bolts.

4. The B-pillar of claim 1, wherein, at least in the central portion, the fibre composite part comprises a cupped profile, wherein the fibre composite part laterally embraces the hat profile of the sheet metal formed part.

5. The B-pillar of claim 1, wherein the fibre composite part comprises metallic connectors that are partly embedded in the fibre composite and, by free end regions, protrude from the fibre composite, wherein the free end regions are materially connected to the sheet metal formed part.

6. The B-pillar of claim 1, wherein the fibre composite part comprises a reinforcing insert embedded into the fibre composite.

7. The B-pillar of claim 1, wherein at least in the lower portion, the fibre composite part rests on the sheet metal formed part such that the fibre composite part is supported against the sheet metal formed part in the longitudinal direction.

8. The B-pillar of claim 1, wherein in at least one of an upper region of the base portion and a lower end region of the central portion, the sheet metal formed part comprises a hardened high-strength portion.

9. The B-pillar of claim 1, wherein the sheet metal formed part is hot-formed and at least partially hardened.

10. The B-pillar of claim 1, wherein an outer edge of the fibre composite part is spaced from an outer edge of the sheet metal formed part such that between the outer edge of the fibre composite part and the outer edge of the sheet metal formed part the sheet metal formed part forms a single-layer connecting flange of the B-pillar.

11. The B-pillar of claim 1, wherein the sheet metal formed part comprises two opposed side walls, wherein the fibre composite part is positioned on outer shoulders of the side walls.

12. The B-pillar of claim 1, wherein the length of the head portion is smaller than or equal to 15% of the length of the sheet metal formed part, and/or the length of the base portion is smaller than or equal to 25% of the length of the sheet metal formed part.

13. The B-pillar of claim 1, wherein the length of the fibre composite part is between 50% and 90% of the length of the sheet metal formed part.

14. A motor vehicle body, comprising:
   a B-pillar, wherein the B-pillar comprises
      a sheet metal formed part that includes a head portion, a central portion and a base portion, and an inner side and an outer side;
      wherein the head portion, on the inner side comprises a connecting region for connecting the B-pillar to a roof region of the motor vehicle body;
      wherein the base portion is configured for connecting the B-pillar to a sill region of the motor vehicle body;
      wherein the central portion extends between the head portion and the base portion and defines a longitudinal direction of the B-pillar, wherein the sheet metal formed part comprises at least in the central portion a hat profile such that on the inner side a hollow chamber for receiving vehicle attaching parts is formed; and
      a fibre composite part having an upper portion, a central portion and a lower portion,
      wherein the lower portion ends in the central portion of the sheet metal formed part; and
      wherein the fibre composite part is attached to the outer side of the sheet metal formed part and that the head portion of the sheet metal formed part comprises a supporting region at the outer side, wherein the upper portion of the composite fibre part comprises a contact region that laterally embraces the supporting region and is supported against same in the longitudinal direction of the B-pillar;
   wherein the fibre composite part of the B-pillar is visible from outside of the motor vehicle body.

* * * * *